(12) United States Patent
Villa et al.

(10) Patent No.: US 8,912,364 B2
(45) Date of Patent: Dec. 16, 2014

(54) CONTINUOUS LOOP FLOW PROCESS FOR POLYETHER POLYOL PRODUCTION

(75) Inventors: Carlos M. Villa, Lake Jackson, TX (US); John W. Weston, Sugar Land, TX (US); Pradeep Jain, Lake Jackson, TX (US); Leigh H. Thompson, Lake Jackson, TX (US); Jean-Paul Masy, Destelbergen (BE)

(73) Assignee: Dow Global Technologies LLC, Midland, MI (US)

( * ) Notice: Subject to any disclaimer, the term of this patent is extended or adjusted under 35 U.S.C. 154(b) by 691 days.

(21) Appl. No.: 12/992,025

(22) PCT Filed: May 19, 2009

(86) PCT No.: PCT/US2009/044449
§ 371 (c)(1),
(2), (4) Date: Nov. 10, 2010

(87) PCT Pub. No.: WO2009/143103
PCT Pub. Date: Nov. 26, 2009

(65) Prior Publication Data
US 2011/0105802 A1    May 5, 2011

Related U.S. Application Data

(60) Provisional application No. 61/054,465, filed on May 19, 2008.

(51) Int. Cl.
*C08G 65/00* (2006.01)
*C08G 65/26* (2006.01)

(52) U.S. Cl.
CPC ........ *C08G 65/2663* (2013.01); *C08G 65/2609* (2013.01); *C08G 65/2696* (2013.01)
USPC ...................................................... 568/679

(58) Field of Classification Search
USPC .......................................... 568/679; 422/132
See application file for complete search history.

(56) References Cited

U.S. PATENT DOCUMENTS

| | | | | |
|---|---|---|---|---|
| 3,900,518 | A | 8/1975 | Milgrom | 260/573 |
| 5,158,922 | A | 10/1992 | Hinney et al. | 502/175 |
| 5,689,012 | A * | 11/1997 | Pazos et al. | 568/619 |
| 5,789,626 | A | 8/1998 | Le-Khac | 568/620 |
| 5,977,251 | A | 11/1999 | Kao et al. | 525/53 |
| 6,673,972 | B2 | 1/2004 | Ostrowski et al. | 568/620 |
| 7,012,164 | B2 | 3/2006 | Yamada et al. | 568/620 |
| 7,348,460 | B2 | 3/2008 | Wulff et al. | 568/618 |
| 2003/0004378 | A1 | 1/2003 | Ostrowski et al. | 568/620 |
| 2006/0155151 | A1 | 7/2006 | Verwijs et al. | 568/679 |

FOREIGN PATENT DOCUMENTS

| | | | |
|---|---|---|---|
| CN | 1396939 | 2/2003 | B01J 27/26 |
| CN | 1867609 | 11/2006 | C08G 65/00 |
| DE | 203735 | 12/1983 | C08G 65/10 |
| EP | 0 654 302 | 11/1994 | B01J 27/26 |
| EP | 0 879 259 | 2/1997 | C08G 65/26 |
| EP | 0 912 625 | 2/2006 | C08G 65/26 |
| JP | 06-16806 | 1/1994 | C08G 65/28 |
| WO | 01/62826 | 8/2001 | C08G 65/26 |
| WO | 2004/081082 | 9/2004 | C08G 65/00 |
| WO | WO 2004/081082 | 9/2004 | C08G 65/00 |
| WO | 2005/103116 | 11/2005 | C08G 65/26 |
| WO | 2007/025881 | 3/2007 | C08G 65/26 |

OTHER PUBLICATIONS

Preliminary Report on Patentability; Application No. PCT/US2009/044449; pp. 7, Dec. 2, 2010.
Chinese Office Action with English translation; Application No. 200980127990.2; pp. 14, Mar. 21, 2012.
PCT International Search Report and Written Opinion of International Application No. PCT/US2009/044449 filed May 19, 2009, 13 pages, Mailing Date Sep. 23, 2009.
Opposition to EP 912625 (Application No. 97933667.4), 6 pages, Nov. 21, 2006.
"Synthesis of High Molecular Weight Plyether Polyols with Double Metal Cyanide Catalysts (DMC Catalysts)", Chapter 5 of Chemistry and Technology of Polyols for Polyurethanes by by Mihail Ionescu, pp. 167-183, Published in 2005.
"Hexacyanometalate Salt Complexes as Catalysts for Epoxide Polymerizations" by R. J. Herold and , R. A. Livigni, Chapter 15, pp. 208-229, *Advances in Chemistry*, vol. 128, Publication Date (Print): Jun. 1, 1973.
"Poly(Propylene Ether) Polyols Prepared With a Zinc Hexacyanocobaltate Complex Catalyst" by R. A. Livigni, R. J. Herold, O. C. Elmer, and , S. L. Aggarwal, Chapter 2, pp. 20-37, *ACS Symposium Series*, vol. 6, Publication Date (Print): Jun. 1, 1975.
Chinese Office Action; Application No. 200980127990.2; pp. 4, Oct. 11, 2012.
Chinese Office Action Translation; Application No. 200980127990.2; pp. 11, Jun. 3, 2013.

* cited by examiner

*Primary Examiner* — Rosalynd Keys
(74) *Attorney, Agent, or Firm* — Baker Botts L.L.P.

(57) ABSTRACT

The present disclosure relates, according to some embodiments, to compositions, apparatus, methods, and systems that may be used to produce polyols, for example, polyether polyols with a narrow range of molecular weights, with little if any unsaturated byproducts, in a sustained and/or continuous reaction, with efficient heat transfer, and/or at high production rates. For example, in some embodiments, teachings of the disclosure may be used to produce polyether polyols in a continuous loop flow process. A continuous loop flow process may be practiced such that heat is effectively transferred and/or product properties (e.g., range of molecular weights) are controllable. For example, a continuous loop flow process may use one or more continuous flow loops comprising a heat exchanger, a means to move material around each loop, inlets for catalyst, monomer, initiator or starter, and an outlet for polyol product.

15 Claims, 5 Drawing Sheets

US 8,912,364 B2

CONTINUOUS LOOP FLOW PROCESS FOR POLYETHER POLYOL PRODUCTION

PRIORITY

This application is a 371 U.S. national application of International Application Number PCT/US2009/044449 filed May 19, 2009, which designates the United States; which claims the benefit of U.S. Provisional Application 61/054,465 filed May 19, 2008, the contents of which are hereby incorporated by reference in its entirety.

FIELD OF THE DISCLOSURE

The present disclosure relates, in some embodiments, to compositions, apparatus, methods, and systems for producing polyols, e.g., polyether polyols.

BACKGROUND OF THE DISCLOSURE

Foam (e.g., a polyurethane foam) may be produced, in part, by reacting an alcohol with isocyanate. Polyols may provide hydroxyl groups and/or other functional groups that are reactive with isocyanate. The particular polyol(s) selected may impact the properties and/or the processing of the resulting foam. For example, polyether type polyols may be selected to produce a flexible foam.

Polyether type polyols may be formed by an exothermic reaction of an organic oxide with an initiator having at least one active hydrogen. An initiator may be reacted with an alkylene oxide in the presence of potassium hydroxide (KOH) to form a polyol. However, since KOH has little or no molecular weight selectivity, processes (e.g., continuous processes) that use KOH may yield a mixture of polyols having a broad range of molecular weights. A polyol composition produced using KOH may contain residual KOH. It may be desirable and/or necessary to remove this KOH from the polyol in preparation for reaction with isocyanate or other processing, thereby increasing the difficulty and costs of producing a polyol. A polyol composition produced using KOH may contain unsaturated byproducts that result from the formation of unsaturated monols (e.g., allyl alcohol). In addition, using a KOH catalyst may limit the polyol functionality and/or maximum molecular weight of the finished product polyol. For example, polyol functionality may decrease as the polyol equivalent weight increases when using a KOH catalyst.

A double metal cyanide catalyst (DMC) may be used as an alternative to KOH. In a continuous process, KOH may produce polyols with an undesirably wide molecular weight distribution. A metal cyanide catalyst may be desirable in a continuous process to produce polyols with a narrower molecular weight distribution. In addition, polyol compositions produced using a DMC catalyst may not require further processing to remove residual catalyst. However, existing catalytic processes may have poor heat transfer characteristics and/or low production rates.

SUMMARY

Accordingly, a need has arisen for improved compositions, apparatus, systems, and methods for producing polyols, e.g., polyether polyols. The present disclosure relates, according to some embodiments, to compositions, apparatus, methods, and systems that may be used to produce polyols, for example, polyether polyols with a desired range (e.g., a narrow range) of molecular weights, with little if any unsaturated byproducts, in a sustained and/or continuous reaction, with efficient (e.g., much more efficient) heat transfer, and/or at high production rates. For example, in some embodiments, compositions, apparatus, methods, and systems of the disclosure may be used to produce polyols in a continuous loop flow process. A continuous loop flow process may be practiced such that heat is effectively transferred and/or product properties (e.g., range of molecular weights) are controllable. For example, a continuous loop flow process may use one or more continuous flow loops comprising a heat exchanger, a pump that circulates the material around each loop (e.g., at a recycle ratio of at least about 10), inlets for catalyst, monomer, initiator or starter, and an outlet for polyol products. A flow loop, according to some embodiments, may substantially exclude (e.g., completely exclude) a tank reactor. For example, a heat exchanger may provide all of the heat transfer area and more than about 90% of the reaction volume. In some embodiments, a reactor may include a chamber or vessel downstream of a flow loop, where unreacted monomer and/or other materials may be removed (e.g., by finishing and/or digestion).

An alkoxylation process may comprise continuously contacting (a) a compound comprising at least one active hydrogen (e.g., one active hydrogen, two active hydrogens, three active hydrogens) (a "starter" or "initiator"), (b) a compound comprising an alkene oxide (e.g., ethylene oxide, propylene oxide, butylene oxide, higher molecular weight oxides, and/or mixtures thereof), and (c) a double metal cyanide catalyst in a continuous flow loop under conditions that permit formation of a polyether polyol at least in part by alkoxylation, according to some embodiments. An alkoxylation process, in some embodiments, may also comprise continuously maintaining the spread in flow loop temperature equal to or less than about 5° C. (e.g., equal to or less than about 2° C.). In some embodiments, an alkoxylation process may further comprise continuously maintaining the spread in unreacted alkene oxide concentration in the continuous flow loop at no more than about 2 weight percent (e.g., no more than about 1 weight percent). A compound comprising at least one active hydrogen may comprise a polymer of a material selected from the group consisting of ethylene glycol, propylene glycol, glycerine, 1,1,1-trimethylol propane, 1,1,1-trimethylol ethane, 1,2,3-trihydroxybutane, pentaerythritol, xylitol, arabitol, mannitol, 2,5-dimethyl-3-hexyn-2,5-diol, 2,4,7,9-tetramethyl-5-decyne-4,7-diol sucrose, sorbitol, an alkyl glucoside, and combinations thereof, according to some embodiments. A polymer (e.g., an initiator) may have a molecular weight of, for example, from about 30 to about 900 daltons. In some embodiments, a double metal cyanide catalyst may comprise at least one metal selected from the group consisting of potassium, zinc, cobalt, iron, chromium, platinum, iridium, and combinations thereof. For example, a double metal cyanide catalyst may comprise zinc hexacyanocobaltate $Zn_2[Co(CN)_6]_2$. An alkoxylation process may further include, according to some embodiments, continuously removing the heat of reaction from at least a portion of the continuous flow loop at a thermal energy removal rate of at least about 400 Btu/hour-cubic foot·° F. Continuously maintaining the spread in unreacted alkene oxide concentration in the continuous flow loop at no more than about 2 weight percent may comprise continuously recycling at least a portion of (1) the compound comprising at least two active hydrogens, (2) the compound comprising an alkene oxide, (3) the double metal cyanide catalyst, and (4) the polyether polyol through the flow loop at a recycle ratio of at least 10, in some embodiments.

According to some embodiments, a polyether polyol composition may be obtained from a process comprising (a) continuously contacting a compound comprising at least one active hydrogen, a compound comprising an alkene oxide, and a double metal cyanide catalyst in a continuous flow loop under conditions that permit formation of a polyether polyol at least in part by alkoxylation, (b) continuously maintaining the spread in flow loop temperature equal to or less than about 5° C., and (c) continuously maintaining the spread in unreacted alkene oxide concentration in the continuous flow loop at no more than about 2 weight percent. A polyether polyol produced, in some embodiments, may have a molecular weight of from about 700 to about 20,000 daltons and/or from about 200 to about 7,000 daltons. A polyether polyol produced may have, according to some embodiments, a polydispersity index of from about 1 to about 2.

According to some embodiments, a process for producing a polyether polyol may comprise providing a reactor having a reactor volume (e.g., equal to or greater than about 1 m$^3$, equal to or greater than about 12 m$^3$), wherein the reactor comprises (a) at least one continuous flow loop operable to permit the continuous flow of at least a portion of a reaction stream, (b) at least one monomer inlet in fluid communication with the at least one flow loop, (c) at least one initiator inlet in fluid communication with the at least one flow loop, (d) at least one catalyst inlet in fluid communication with the at least one flow loop, (e) at least one heat exchanger in fluid communication with the at least one flow loop and operable to remove heat of reaction from the reaction stream, and/or (f) at least one product outlet in fluid communication with the at least one flow loop and downstream of the at least one catalyst inlet. A process for producing a polyether polyol may further comprise, in some embodiments, (a) providing a reaction stream flowing in the continuous flow loop, (b) admitting a monomer (e.g., ethylene oxide, propylene oxide, butylene oxide, higher molecular weight oxides, and/or mixtures thereof) into the reaction stream through the at least one monomer inlet, (c) admitting an initiator into the reaction stream through the at least one initiator inlet, (d) admitting a double metal cyanide catalyst into the reaction stream through the at least one catalyst inlet under conditions that permit formation of a polyether polyol, (e) contacting the reaction stream with the heat exchanger under conditions that permit thermal energy to be removed from the reaction stream at a thermal energy removal rate of at least about 400 Btu/hour-cubic foot·° F., (f) removing a portion of the reaction stream through the at least one product outlet, and/or (g) recirculating the remaining portion of the reaction stream around the flow loop. In some embodiments, a recycle ratio for process for producing a polyether polyol may be at least about 10. A spread in monomer concentration (e.g., between any two loci throughout a reaction volume), in some embodiments, may be equal to or less than about 5%. According to some embodiments, a spread in flow loop temperature (e.g., between any two loci throughout a reaction volume) may be equal to or less than about 5° C. In some embodiments, an initiator may comprise a polymer (e.g., having a molecular weight of from about 300 to about 900 daltons) of a material selected from the group consisting of ethylene glycol, propylene glycol, glycerine, 1,1,1-trimethylol propane, 1,1,1-trimethylol ethane, 1,2,3-trihydroxybutane, pentaerythritol, xylitol, arabitol, mannitol, 2,5-dimethyl-3-hexyn-2,5-diol, 2,4,7,9-tetramethyl-5-decyne-4,7-diol sucrose, sorbitol, an alkyl glucoside, and combinations thereof. A precursor initiator (e.g., a precursor of a functionalized initiator), in some embodiments, may comprise a vegetable oil, a modified vegetable oil, an animal fat, a modified animal fat, and/or the like. In some embodiments, a double metal cyanide catalyst may comprise at least one metal selected from the group consisting of potassium, zinc, cobalt, iron, chromium, platinum, iridium, and combinations thereof. In some embodiments, a process may be configured and arranged to run with (a) a thermal energy removal rate of at least about 400 Btu/hour-cubic foot·° F., (b) a recycle ratio of at least about 10, (c) a spread in monomer concentration may be equal to or less than about 1%, and/or (d) a spread in flow loop temperature may be equal to or less than about 5° C. A reaction stream flowing in a continuous flow loop may have a Reynold's number of from about 1,000 to about 1,000,000, according to some embodiments.

An apparatus for producing a polyether polyol may comprise, in some embodiments, one or more reactors, each reactor comprising (a) at least one continuous flow loop operable to permit the continuous flow of at least a portion of a reaction stream, (b) at least one monomer inlet in fluid communication with the at least one flow loop and operable to admit a monomer into the at least one flow loop, (c) at least one initiator inlet in fluid communication with the at least one flow loop and operable to admit an initiator into the at least one flow loop, (d) at least one catalyst inlet in fluid communication with the at least one flow loop and operable to admit a double metal cyanide catalyst into the at least one flow loop, (e) at least one heat exchanger in fluid communication with the at least one flow loop and operable to remove heat of reaction from the reaction stream at a thermal energy removal rate of at least about 400 Btu/hour-cubic foot·° F., (f) at least one product outlet in fluid communication with the at least one flow loop and downstream of the at least one catalyst inlet, and/or (g) at least one device operable to move at least a portion of the reaction stream through the continuous flow loop with a recycle ratio of at least 10 (e.g., at least about 100). An apparatus (e.g., a reactor) for producing a polyether polyol may be configured and arranged to (a) accommodate a thermal energy removal rate of at least about 400 Btu/hour-cubic foot·° F., (b) maintain a spread in monomer concentration equal to or less than about 1%, (c) maintain a spread in flow loop temperature equal to or less than about 5° C., and/or (d) have a reactor volume equal to or greater than about 1 cubic meter (e.g., equal to or greater than about 12 m$^3$). In some embodiments, a continuous flow loop may be configured and arranged to have at least about 60% of its volume in heat-transfer contact with the at least one heat exchanger. An apparatus for producing a polyether polyol may further comprise a second reactor comprising (a) at least one second continuous flow loop operable to permit the continuous flow of at least a portion of a second reaction stream, (b) at least one second monomer inlet in fluid communication with the at least one second flow loop and operable to admit a second monomer into the at least one second flow loop, (c) at least one second initiator inlet in fluid communication with the at least one second flow loop and operable to admit a second initiator into the at least one second flow loop, (d) at least one second catalyst inlet in fluid communication with the at least one second flow loop and operable to admit a second double metal cyanide catalyst into the at least one second flow loop, (e) at least one second heat exchanger in fluid communication with the at least one second flow loop and operable to remove heat of reaction from the second reaction stream at a thermal energy removal rate of at least about 400 Btu/hour-cubic foot·° F., (f) at least one second product outlet in fluid communication with the at least one second flow loop and downstream of the at least one second catalyst inlet, and/or (h) at least one second pump operable to pump at least a portion of the second reaction stream through the second continuous flow loop with a recycle ratio of at least 10.

According to some embodiments, a system for producing a polyether polyol may comprise a reactor (e.g., comprising at least one continuous flow loop, at least one monomer inlet, at least one initiator inlet, at least one catalyst inlet, and/or at least one product outlet) and a reaction stream (e.g., comprising a compound comprising at least two active hydrogens, a compound comprising an alkene oxide, and a double metal cyanide catalyst). A system for producing a polyether polyol, in some embodiments, may comprise a monomer chamber in fluid communication with the at least one monomer inlet, an initiator chamber in fluid communication with the at least one initiator inlet, and/or a catalyst chamber in fluid communication with the at least one catalyst inlet. In some embodiments, a system for producing a polyether polyol may comprise a product chamber in fluid communication with the at least one product outlet. In some embodiments,—a system for producing a polyether polyol may comprise a tubular reactor in fluid communication with the at least one product outlet, wherein the tubular reactor is configured and arranged to remove unreacted monomer.

BRIEF DESCRIPTION OF THE DRAWINGS

Some embodiments of the disclosure may be understood by referring, in part, to the present disclosure and the accompanying drawings, wherein.

DETAILED DESCRIPTION

Figure 1:
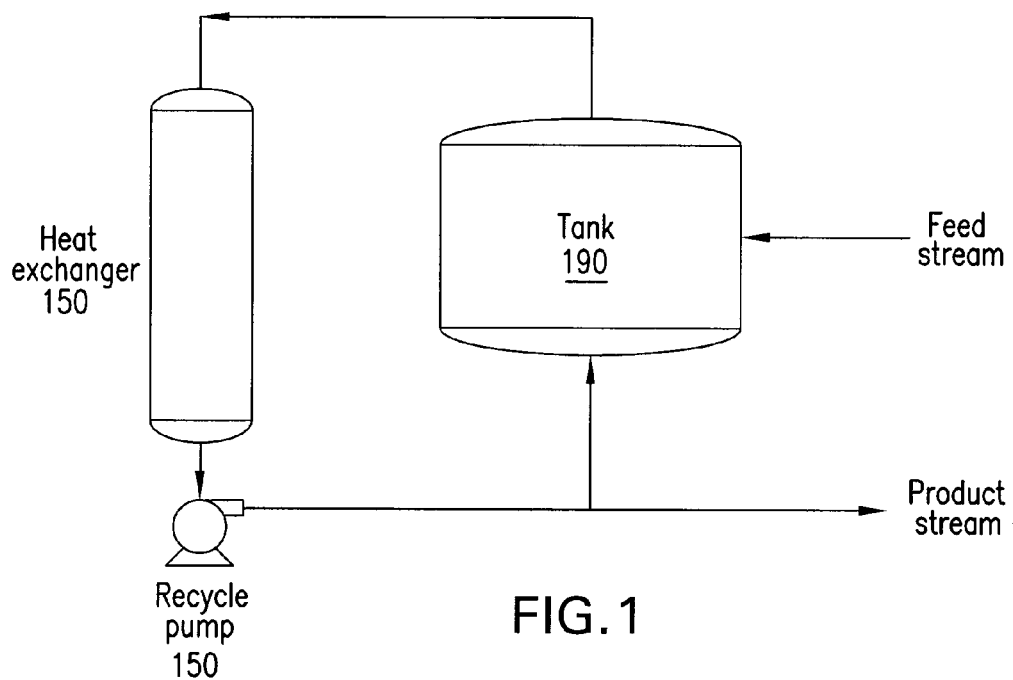
FIG. 1 illustrates a specific example embodiment of a reactor configuration according to the present disclosure.

The present disclosure relates, in some embodiments, to compositions, apparatus, methods, and systems for alkoxylation (e.g., alkoxylating a starter and/or initiator) to produce, for example, a polyol (e.g., a polyether polyol). An alkoxylation system and/or apparatus may include one or more inlets (e.g., to admit one or more monomers (e.g., oxides), one or more initiators, one or more catalysts, and/or one or more solvents), one or more outlets (e.g., to release one or more polymers, one or more solvents, and/or one or more side reaction products), a pump (e.g., a circulating pump), a heat exchanger, and/or a reaction chamber. A reaction chamber, in some embodiments, may be configured as a continuous flow loop.

A loop reactor, in some embodiments, may include at least two heat exchangers in series and at least one circulation pump. When multiple feed and/or exit points are used, two or more heat exchangers may be desirable, for example, for the purpose of dispersing catalyst, reducing spreads in monomer concentration, and/or reducing spreads in temperature along the direction of flow. A static or dynamic mixing device may be installed to mix the circulating flow in the loop reactor with the reactor feed streams.

Apparatus

According to some embodiments of the disclosure, formation of a polyether polyol may occur in a reactor apparatus (e.g., a continuous loop flow reactor). A reactor apparatus for alkoxylation and/or producing a polyether polyol, in some embodiments, may comprise:

(A) a reactor having a reactor volume, the reactor comprising:
(1) at least one flow loop operable to permit the flow of a reaction stream;
(2) at least one product outlet in fluid communication with the at least one flow loop;
(3) at least one initiator inlet in fluid communication with the at least one flow loop and operable to permit at least one initiator to flow into the at least one flow loop;
(4) at least one catalyst inlet in fluid communication with the at least one flow loop and operable to permit catalyst to flow into the at least one flow loop;
(5) at least one monomer inlet in fluid communication with the at least one flow loop and operable to permit monomer to flow into the at least one flow loop;
(6) at least one heat exchanger in fluid communication with the at least one flow loop and operable to remove heat of reaction from the reaction stream (e.g., at a volumetric heat removal rate of at least about 400 Btu/hour-cubic foot·° F. (7.4 kW/m$^3$·K); and
(7) at least one apparatus operable to move, e.g., pump, the reaction stream around the at least one flow loop.

A reactor apparatus (e.g., for alkoxylation and/or producing a polyether polyol) may comprise, in some embodiments:

(A) a first reactor having a first reactor volume, the first reactor comprising:
(1) a first flow loop operable to permit the flow of a first reaction stream,
(2) at least one first product outlet in fluid communication with the first flow loop,
(3) at least one first initiator inlet in fluid communication with the at least one first flow loop and operable to permit at least one first initiator to flow into the at least one first flow loop;
(4) at least one first catalyst inlet in fluid communication with the first flow loop and operable to permit catalyst to flow into the first flow loop,
(5) at least one first monomer inlet in fluid communication with the first flow loop and operable to permit monomer to flow into the first flow loop,
(6) at least one first heat exchanger in fluid communication with the first flow loop and operable to remove heat of reaction from the first reaction stream (e.g., at a volumetric heat removal rate of at least about 400 Btu/hour-cubic foot·° F. (7.4 kW/m$^3$·K), and
(7) at least one first apparatus operable to move, e.g., pump, the first reaction stream around the first flow loop from the at least one first heat exchange apparatus to the at least one first product outlet; and (B) a second reactor having a second reactor volume, the second reactor comprising:
(1) a second flow loop operable to permit the flow of a second reaction stream,
(2) at least one second product outlet in fluid communication with the second flow loop,
(3) at least one second initiator inlet in fluid communication with the at least one second flow loop and operable to permit at least one second initiator to flow into the at least one second flow loop;

(4) at least one second catalyst inlet in fluid communication with the second flow loop and operable to permit catalyst to flow into the second flow loop, (5) at least one second monomer inlet in fluid communication with the second flow loop and operable to permit monomer to flow into the second flow loop, (6) at least one second heat exchanger in fluid communication with the second flow loop and operable to remove heat of reaction from the second reaction stream (e.g., at a volumetric heat removal rate of at least about 400 Btu/hour-cubic foot·° F. (7.4 kW/m$^3$·° K), (7) at least one second apparatus operable to move, e.g., pump, the second reaction stream around the second flow loop from the at least one second heat exchange apparatus to the at least one second product outlet, and (8) at least one first product inlet in fluid communication with the at least one first product outlet and in fluid communication with the second flow loop, thereby operable to convey at least a portion of the first reaction stream (e.g., containing a first reaction product) from the first flow loop to the second flow loop.

A reaction stream may comprise, for example, one or more monomers (e.g., oxides), one or more initiators, one or more catalysts, one or more products (e.g., a polyol), one or more solvents, and mixtures thereof.

In some embodiments, a reactor apparatus for alkoxylation (e.g., to form a polyether polyol) may comprise a reactor comprising two or more flow loops, each flow loop having a reactor volume. For example, two or more loop flow reactors may be connected in series when blocks of different compositions are needed and/or desired in a polyol product. Final product composition in each reactor may be controlled, in part, by selecting and/or adjusting the monomer composition and/or the reaction conditions. For example, a different monomer and/or mixture of monomers may be used in each reactor.

In some embodiments, a reaction chamber may define a reactor volume. All or substantially all of a reactor volume may be occupied by a liquid (e.g., to the exclusion or substantial exclusion of a vapor phase) in some embodiments. A liquid may comprise one or more monomers, one or more initiators, one or more oxides, one or more catalysts, and/or one or more solvents. An alkoxylation system and/or apparatus may have, in some embodiments, a reactor size (e.g., reactor volume) of greater than about 1 cubic meter, greater than about 3 cubic meters, greater than about 10 cubic meters, greater than about 12 cubic meters, greater than about 30 cubic meters, up to about 100 cubic meters, and/or greater than about 100 cubic meters.

Inlet(s)

According to some embodiments, an apparatus may be configured and arranged to include one or more inlets operable to admit one or more monomers (e.g., oxides), one or more initiators, one or more catalysts, and/or one or more solvents. For example, an inlet may be dedicated to admitting a single material to a reaction chamber and/or an inlet may configured and arranged to admit two or more materials (e.g., initiator and catalyst) into a reaction chamber. According to some embodiments, where a plurality of inlets are present, like inlets may be grouped together or interspersed with other inlets.

An inlet, according to some embodiments, may be configured and arranged to admit a material (e.g., in metered amounts) into a reaction chamber continuously, intermittently, and/or sporadically under manual and/or automated (e.g., computer) control. Similarly, an outlet, in some embodiments, may be configured and arranged to allow a material out of a reaction chamber (e.g., in metered amounts) continuously, intermittently, and/or sporadically under manual and/or automated (e.g., computer) control. In some embodiments, an inlet may be configured and arranged to introduce a defined amount of well-mixed material (e.g., catalyst, initiator, monomer, and/or solvent) into a flow loop. For example, an inlet may be configured and arranged as an injector. An injector may be configured and arranged to introduce a finely dispersed stream or streams of material (e.g., catalyst, initiator, monomer, and/or solvent) into a flow loop. A finely dispersed stream may be disposed to axially traverse a flow loop upon introduction.

In some embodiments, catalyst, monomer, and/or initiator may be pre-mixed before entering a flow loop. For example, a catalyst inlet may comprise a body with a monomer inlet and/or an initiator inlet, a mixing zone in fluid communication with the monomer inlet and/or an initiator inlet, a catalyst port operable to admit catalyst into the mixing zone, and/or a mixing zone outlet operable to release catalyst (e.g., catalyst mixed with monomer and/or initiator) into a reaction chamber. In some embodiments, it may be desirable to configure and arrange the sequencing of a catalyst inlet, a monomer inlet, an initiator inlet, a mixing device, and/or a heat exchanger to reduce (e.g., minimize) local concentration differences.

An inlet may include, in some embodiments, an injector. For example, an inlet may include a monomer injector. A monomer injector may finely disperse monomer into a flowing reaction stream such that the reaction stream is a single phase and/or substantially a single phase solution and/or suspension (e.g., with catalyst suspended therein) in some embodiments. An injector, according to some embodiments, may have a body with a plurality of fluid exit ports and/or may be positioned in a flowing reaction steam such that injected material flows from the body ports (e.g., upstream, transversely, and/or downstream) into the reaction stream. An injector may be configured and arranged to introduce injected material in a downstream or substantially downstream direction in some embodiments.

A body of an injector (e.g., a monomer injector) may have, according to some embodiments, a cross-section, which when viewed from above, has a circular shape and/or a donut shape. In some embodiments, a body of an injector may have a plurality of processes (e.g., 4, 10, or 12 arms) with each process having a plurality of exit ports. Exit ports on a body and/or process of an injector may be disposed, for example, at different axial positions.

According to some embodiments, injectors may be positioned in a reaction stream in any orientation and multiple injectors may be positioned at different axial positions. For example, injectors may be offset from each other (e.g. looking into the reactor from above) so that materials are injected into substantially the whole cross-section of the reaction stream.

A reactor may include, in some embodiments, a mechanical mixer (e.g., stirrer, agitator, static mixer). For example, a mixer may be positioned at or near one or more inlets for stirring ingredients as they enter into the reaction stream. Any material or combination of materials may be mixed and/or reacted, according to some embodiments, in a reaction chamber. In some embodiments, any material or combination of materials may be mixed and/or reacted in an external stirring tank (e.g., prior to entering a reaction chamber). For example, catalyst may be mixed with initiator and/or monomer may be mixed with initiator. In some embodiments, it may be undesirable to directly mix catalyst and monomer.

Heat Exchanger

Each loop flow reactor may comprise one or more heat exchangers and, optionally, pipes connecting them to each other and/or to the remainder of the reactor, according to some embodiments. A flow loop may be configured, in some embodiments, with or without interconnecting pipes between components. In some embodiments, it may be desirable to configure every element along the flow path to act as a reaction zone. In such embodiments, the regions where heat transfer takes place may be maximized at the expense of connecting pipes where the transfer is minimal or non-existent. A heat exchanger may comprise, in some embodiments, at least one cooling fluid inlet and at least one cooling fluid outlet. According to some embodiments, a heat exchanger may further comprise at least one reaction stream inlet and at least one reaction stream outlet. In some embodiments, a reactor may be configured and arranged so that one or more heat exchangers account for more than about 60% of the total reactor volume, more than about 70% of the total reactor volume, more than about 75% of the total reactor volume, more than about 80% of the total reactor volume, more than about 75% of the total reactor volume, more than about 90% of the total reactor volume, more than about 95% of the total reactor volume, up to about 100% of the total reactor volume. For example, a reactor may be configured and arranged such that at least about 60% of the volume of a continuous flow loop may be in heat-transfer contact with the at least one heat exchanger.

In some embodiments, any heat exchange apparatus may be used, in any configuration. For example, a heat exchanger may include a cooling coil positioned in a flow loop. In another example, a heat exchanger may include a shell-and-tube heat exchanger positioned in a flow loop wherein the flow stream passes through the tubes. In another example, an entire flow loop may be configured as a heat exchanger by enclosing it in a cooling jacket or double piping. In some embodiments, a shell-and-tube heat exchanger may be used with a housing having an inlet and an outlet for the reaction mixture and an inlet and outlet for heat transfer media (e.g., water, steam, SYLTHERM™ material or media supplied by The Dow Chemical Company under the designation DOWTHERM®). A reaction mixture may flow through a plurality of heat transfer tubes within the housing, in some embodiments, while the heat transfer media flows over the tubes' exterior surfaces transferring the heat of reaction or polymerization from the reaction mixture. According to some embodiments, a reaction stream may flow through the housing while the heat transfer media flows through the tubes. In some embodiments, a desirable heat exchanger geometry is that of a shell-and-tube exchanger, with the process fluid on the tube side (e.g., for efficient heat transfer and/or lower expense at the operating pressures of a polyol manufacturing process).

In some embodiments, heat transfer in a heat exchanger may be expressed according to the following energy balance:

$$\rho \frac{V_{loop}}{\tau} \Delta H = U a V_{exchanger} \Delta T \quad \text{(Eq. 1)}$$

where
$\rho$ is mixture density, lb/ft$^3$ (kg/m$^3$)
$\tau$ is average residence time, hr
$\Delta H$ is enthalpy difference between inlet and outlet streams, Btu/lb (J/kg)
$V_{loop}$ is total loop volume, ft$^3$ (m$^3$)

$V_{exchanger}$ is heat exchanger volume, ft$^3$ (m$^3$)
U is overall heat transfer coefficient, Btu/hr·ft$^{2 \cdot \circ}$ F. (kW/m$^2$K)
a is heat transfer area per unit volume, ft$^{-1}$ (m$^{-1}$)
$\Delta T$ is mean temperature difference, $^\circ$ F. (K)
Total loop volume may be estimated as:

$$V_{loop} = V_{exchanger} + V_{tank} + V_{pump} + V_{piping} \quad \text{(Eq. 2)}$$

Tank and heat exchanger may dominate, in some embodiments, wherein a good approximation may be expressed as follows:

$$V_{loop} \approx V_{exchanger} + V_{tank} \quad \text{(Eq. 3)}$$

In some embodiments, a tank volume may be greater than, about the same as, or less than a heat exchanger volume. Energy balance may be rewritten as:

$$\rho = \frac{\Delta H}{\tau \Delta T} = U a \frac{V_{exchanger}}{V_{loop}} \quad \text{(Eq. 4)}$$

The combination of terms on the right hand side may be referred to as the 'volumetric heat removal rate.'

A volumetric heat removal rate may be estimated for a reactor comprising a tank and a heat exchanger as follows. During polyol production, a heat transfer coefficient may be 200 Btu/hr·ft$^{2 \cdot \circ}$ C. The heat transfer area per unit volume in a cylindrical geometry like that of a shell-and-tube heat exchanger may be computed in terms of tube diameter as:

$$a = \frac{4}{d} \quad \text{(Eq. 5)}$$

Figure 2:
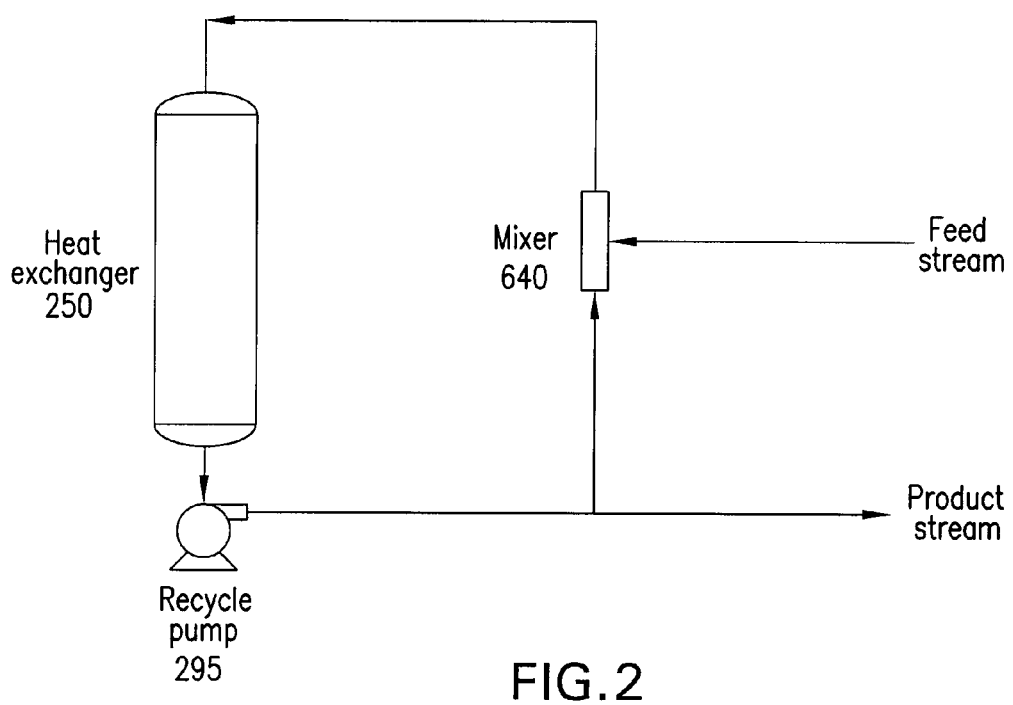
FIG. 2 illustrates a specific example embodiment of a reactor configuration according to the present disclosure.

Assuming 2" tubes, the heat transfer area is 24 ft$^{-1}$. In the specific example configuration shown in FIG. 1, the volume of the heat exchanger may be only 10% of the total loop volume. Under those conditions, the volumetric heat removal rate is 480 Btu/hr·ft$^{3 \cdot \circ}$ C. When the tank is removed, as illustrated, for example, in FIG. 2, the volumetric heat removal rate may be raised to 4800 Btu/hr·ft$^{3 \cdot \circ}$ C. Increasing the volumetric heat removal rate may allow lower values of average residence time and mean temperature difference. Lower average residence times may correspond to smaller total loop volumes and/or higher production rates.

Pump(s)

In some systems, a flow loop reactor may comprise one or more pumps (e.g., in a flow loop). A pump may pump at least a portion of a reaction stream at least a portion of the way around a flow loop. For example, a pump may pump at least a portion of a reaction stream from a heat exchanger to a product outlet. A pump may pump up to the entire reaction stream around up to the entire flow loop.

Tube Reactor

In some embodiments, a product polymer flowing from a product outlet may include desirable polyether polyol(s) and one or more other materials. The one or more other materials may include, for example, solvent, unsaturated byproducts, and/or monomer. Additional examples include unreacted contaminate/impurities in the raw materials. These materials may be removed (e.g., converted, consumed, and/or otherwise reduced or eliminated), in whole or in part, using downstream processing elements (e.g., devolatilizers, horizontally agitated dryers, and/or devolatilizing extruders). In some embodiments, a pressure in a reaction chamber may be sufficient to maintain a reaction stream as a single phase or substantially a single phase (e.g., liquid phase). For example, a reaction chamber pressure may be over about 90 psig, over about 100 psig, over about 120 psig, over about 150 psig, over about 175 psig, over about 200 psig, over about 300 psig, over about 400 psig, and/or over about 500 psig. A reaction chamber pressure, in some embodiments, may be up to about 600 psig or higher. Reactor pressure may be controlled anywhere in the system. For example, a pressure control valve on the loop product outlet line may be used to maintain the pump suction pressure.

In systems with sufficiently active catalysts (e.g., a double metal cyanide catalyst), an apparatus for alkoxylation may be configured to be in fluid communication with at least one tubular reactor. For example, at least one tubular reactor may be in fluid communication with a product outlet. A tubular reactor may be configured and arranged to remove (e.g., convert, consume, and/or otherwise reduce or eliminate) unreacted monomer, if any, in the product stream. A tubular reactor may be desirable at the end of the process or, during the production of block copolymers, for example, when a monomer that has been used in a loop flow reactor is not desired in the loop flow reactor that follows.

Mixer

A reactor may comprise, according to some embodiments, one or more mixers. A mixer may be configured and arranged to reduce (e.g., minimize) local concentration differences between materials in a flow loop. A mixer may comprise, for example, one or more agitators configured and arranged to mix one or more reaction stream components. In some embodiments, a mixer may comprise baffles and/or or other flow loop contours that mix one or more reaction stream components. A mixer comprising baffles and/or flow loop contours may further comprise an agitator in some embodiments.

According to some embodiments, turbulent mixing of liquid streams (e.g., two liquid streams) may be performed using a tee mixer, a jet mixer, a static mixer, and/or an in-line mechanical mixer. For example, a mixer may be selected from a static mixer and an in-line mechanical mixer. A static mixer, in some embodiments, may be simple, compact, and/or energy efficient. According to some embodiments, thorough mixing may be achieved with a vortex static mixer in about five pipe diameters of length (e.g., in 25 cm in a pipe having a diameter of 5 cm) at Reynolds numbers of about 10,000 and above. For example, a High Efficiency Vortex (HEV) may reach a fully developed flow field at Re=10,000. In some embodiments, the volume of a mixer may be negligible compared to the combined volume of other components of a loop.

Storage

According to some embodiments, an apparatus may comprise one or more chambers. As already indicated, for example, an apparatus may include a reaction chamber configured and arranged to permit an alkoxylation reaction. An apparatus, in some embodiments, may further include a catalyst chamber in fluid communication with one or more catalyst inlets and/or an initiator chamber in fluid communication with one or more initiator inlets. An apparatus may include a product chamber in fluid communication with a product outlet and/or a tubular reactor. A catalyst chamber, an initiator chamber, and/or a product chamber may be configured and arranged to store the material(s) contained therein according to some embodiments.

Compositions

Catalyst

Some embodiments, methods, apparatus, and systems may use one or more alkoxylation catalysts. For example, catalysts that favor the growth of short polyol molecules (e.g., double metal cyanide catalysts (DMC catalysts)) may be desirable where a narrow range of molecular weight distribution of the polyol product is desired and/or required. According to some embodiments, a DMC catalyst may comprise a metal selected from potassium, zinc, cobalt, iron, chromium, platinum, and/or iridium. For example, a DMC may include zinc hexacyanocobaltate $Zn_2[Co(CN)_6]_2$ prepared, in part, from potassium hexacyanocobaltate $K_3[Co(CN)_6]$ and a zinc salt. In some embodiments, the final application may dictate the type of catalyst to use.

A catalyst, in some embodiments, may comprise activated catalyst. For example, a catalyst may be activated prior to introduction to a reactor (e.g., before arriving at a catalyst inlet). A catalyst may be activated, for example, upon introduction to a reactor (e.g., in a catalyst inlet). A catalyst may be activated, for example, after introduction to a reactor (e.g., in a reaction chamber within a reactor). A catalyst (e.g., a DMC catalyst), in some embodiments, may be present in a reaction stream at a concentration of from about 1 ppm to about 100 ppm, from about 2 ppm to about 50 ppm, and/or from about 10 ppm to about 25 ppm.

In some embodiments, a DMC compound may comprise a reaction product of a water-soluble metal salt and a water-soluble metal cyanide salt. A water-soluble metal salt may have the general formula $M(X)_n$ in which M is a metal and X is an anion. M may be selected from Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II), and Cr(III). It may be desirable in some embodiments for M to be selected from Zn(II), Fe(II), Co(II), and Ni(II). X may be an anion selected from a halide, a hydroxide, a sulfate, a carbonate, a cyanide, and oxylate, a thiocyanate, an isocyanate, an isothiocyanate, a carboxylate, and a nitrate. The value of n may be from 1 to 3 and satisfy the valency state of M. Examples of a suitable metal salt may include, without limitation, zinc chloride, zinc bromide, zinc acetate, zinc acetonylacetonate, zinc benzoate, zinc nitrate, iron(II) sulfate, iron (II) bromide, cobalt(II) chloride, cobalt(II) thiocyanate, nickel(II) formate, nickel(II) nitrate, and the like, and mixtures thereof.

A water-soluble metal cyanide sale may have the general formula $(Y)_a M'(CN)_b (A)_c$ in which M' may be selected from Fe(II), Fe(III), Co(II), Co(III), Cr(II), Cr(III), Mn(II), Mn(III), Ir(III), Ni(II), Rh(III), Ru(II), V(IV), V(V), and combinations thereof. It may be desirable in some embodiments for M' to be selected from Co(II), Co(III), Fe(II), Fe(III), Cr(III), Ir(III), Ni(II), and combinations thereof. In the formula, Y may be an alkali metal ion or alkaline earth metal ion. A may be an ion selected from the group consisting of halide, hydroxide, sulfate, carbonate, cyanide, oxalate, thiocyanate, isocyanate, isothiocyanate, carboxylate, and nitrate. Both a and b are integers equal to or greater than 1. In addition, the sum of the charges of a, b, and c balances the charge of M'. Examples of a suitable metal cyanide salt may include, without limitation, potassium hexacyanocobaltate(III), potassium hexacyanoferrate(II), potassium hexacyanoferrate(III), calcium hexacyanocobaltate(III), lithium hexacyanocobaltate (III), and the like.

Examples of a double metal cyanide compound may include, without limitation, zinc hexacyanocobaltate(III), zinc hexacyanoferrate(III), nickel hexacyanoferrate(II), and/or cobalt hexacyanocobaltate(III). In some embodiments, it may be desirable to use zinc hexacyanocobaltate(III).

A solid DMC catalyst, according to some embodiments, may include an organic complexing agent. Generally, it may be desirable (e.g., necessary) for a complexing agent to be relatively soluble in water. Examples of some suitable complexing agents are elaborated in U.S. Pat. No. 5,158,922. A complexing agent may be added during preparation and/or immediately following precipitation of the catalyst. An excess amount of the complexing agent may be used. A complexing agent may comprise a water-soluble heteroatom-containing organic compound that may complex with a double metal cyanide compound. For example, complexing agents may include alcohols, aldehydes, ketones, ethers, esters, amides, ureas, nitriles, sulfides, and mixtures thereof. Specific example embodiments of a complexing agent may include, without limitation, a water-soluble aliphatic alcohol selected from ethanol, isopropyl alcohol, n-butyl alcohol, isobutyl alcohol, sec-butyl alcohol, and tert-butyl alcohol. In some embodiments, it may be desirable to use a complexing agent comprising tert-butyl alcohol.

In some embodiments, a solid DMC catalyst may include from about 5 to about 80 wt. %, based on amount of catalyst, of a polyether. For example, it may be desirable to include from about 10 to about 70 wt. % of the polyether. It may be desirable to include from about 15 to about 60 wt. % of the polyether.

A polyether polyol, in some embodiments, may have (e.g., an average of) from about 1 to about 8 hydroxyl functionalities. In some embodiments, a polyether polyol may have a molecular weight (e.g., a number average molecular weight) of from about 200 to about 10,000. A polyether polyol may be made by polymerizing an epoxide in the presence of an active hydrogen-containing initiator and a basic, acidic, or organometallic catalyst (e.g., a DMC catalyst), in some embodiments. Examples of a polyether polyol may include, without limitation, poly(propylene glycol)s, poly(ethylene glycol)s, EO-capped poly(oxypropylene) polyols, mixed EO-PO polyols, butylene oxide polymers, butylene oxide copolymers with ethylene oxide and/or propylene oxide, polytetramethylene ether glycols, and the like. Examples of a polyether polyol may include, without limitation, tripropylene glycol, triethylene glycol, tetrapropylene glycol, tetraethylene glycol, dipropylene glycol monomethyl ether, tripropylene glycol monomethyl ether, monoalkyl and dialkyl ethers of glycols and poly(alkylene glycol)s, and the like. In some embodiments, poly(propylene glycol)s and poly(ethylene glycol)s having number average molecular weights within the range of about 150 to about 500 may be used. An organic complexing agent and a polyether, according to some embodiments, may be used in a double metal cyanide catalyst.

A DMC compound, in some embodiments, may have the general formula I as catalyst:

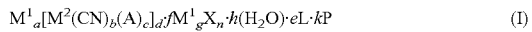

(I)

wherein

M¹ is at least one metal ion selected from the group consisting of $Zn^{2+}$, $Fe^{2+}$, $Fe^{3+}$, $Co^{3+}$, $Ni^{2+}$, $Mn^{2+}$, $Co^{2+}$, $Sn^{2+}$, $Pb^{2+}$, $Mo^{4+}$, $Mo^{6+}$, $Al^{3+}$, $V^{4+}$, $V^{5+}$, $Sr^{2+}$, $W^{4+}$, $W^{6+}$, $Cr^{2+}$, $Cr^{3+}$, $Cd^{2+}$, $Hg^{2+}$, $Pd^{2+}$, $Pt^{2+}$, $V^{2+}$, $Mg^{2+}$, $Ca^{2+}$, $Ba^{2+}$, $Cu^{2+}$, $La^{3+}$, $Ce^{3+}$, $Ce^{4+}$, $Eu^{3+}$, $Ti^{3+}$, $Ti^{4+}$, $Ag^{+}$, $Rh^{3+}$, $Rh^{3+}$, $Ru^{2+}$, $Ru^{3+}$, M² is at least one metal ion selected from the group consisting of $Fe^{2+}$, $Fe^{3+}$, $Co^{2+}$, $Co^{3+}$, $Mn^{2+}$, $Mn^{3+}$, $V^{4+}$, $V^{5+}$, $Cr^{2+}$, $Cr^{3+}$, $Rh^{3+}$, $Ru^{2+}$, $Ir^{3+}$, A and X are each, independently of one another, an anion selected from the group consisting of halide, hydroxide, sulfate, carbonate, cyanide, thiocyanate, isocyanate, cyanate, carboxylate, oxalate, nitrate, nitrosyl, hydrogensulfate, phosphate, dihydrogenphosphate, hydrogenphosphate and hydrogencarbonate, L is a water-miscible ligand selected from the group consisting of alcohols, aldehydes, ketones, ethers, polyethers, esters, polyesters, polycarbonate, ureas, amides, primary, secondary and tertiary amines, ligands having a pyridine nitrogen, nitriles, sulfides, phosphides, phosphites, phosphanes, phosphonates and phosphates, k is a fraction or integer greater than or equal to zero, P is an organic additive, a, b, c, d, g and n are selected so that the compound (I) is electrically neutral, with c being able to be 0, e is the number of ligand molecules and is a fraction or integer greater than 0 or is 0, and f and h are each, independently of one another, a fraction or integer greater than 0 or 0.

Examples of an organic additive P may include, without limitation, polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylamide-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkylenimines, maleic acid and maleic anhydride copolymers, hydroxyethylcellulose, polyacetates, ionic surface- and interface-active compounds, bile acids or their salts, esters or amides, carboxylic esters of polyhydric alcohols and glycosides.

Examples of some DMC catalysts and their preparation may be found in U.S. Pat. Nos. 3,427,334; 3,941,849; 4,477,589; 5,158,922; 5,470,813; 5,482,908; and 7,348,460.

Monomer/Initiator

Methods, apparatus, and systems, according to some embodiments of the disclosure, may be practiced with one or more types of monomers. A monomer, in some embodiments, may be selected from ethylene oxide, propylene oxide, butylene oxide, higher molecular weight oxides, and mixtures thereof. An initiator may include a monol or polyol of diverse molecular weight or/and functionality. For example, a polyalcohol initiator precursor may be selected from ethylene glycol, propylene glycol, glycerine, 1,1,1-trimethylol propane, 1,1,1-trimethylol ethane, 1,2,3-trihydroxybutane, pentaerythritol, xylitol, arabitol, mannitol, 2,5-dimethyl-3-hexyn-2,5-diol, 2,4,7,9-tetramethyl-5-decyne-4,7-diol sucrose, sorbitol, an alkyl glucoside (e.g., methyl glucoside and ethyl glucoside), and mixtures thereof. An initiator may have a molecular weight (e.g., average molecular weight) of from about 30 to about 900 daltons, from about 50 to about 900 daltons, and/or from about 70 to about 900 daltons or more.

An initiator precursor may comprise a vegetable oil, a modified vegetable oil, an animal fat, a modified animal fat, and combinations thereof. For example, an initiator precursor may include an animal fat or vegetable oil having a triglyceride that, upon saponification with a base (e.g., NaOH) yields glycerol and fatty acids, at least some of which comprise at least one double bond (e.g., palmitoleic acid, oleic acid, linoleic acid, linolenic acid, arachidonic acid, and/or alkyl esters thereof). Some examples of initiator precursors and methods of functionalizing initiator precursors may be found in International Application WO 2006/047436.

In some embodiments, a reactor may be operated with a controlled amount of oxide present. For example, a reactor may be operated below a threshold unreacted oxide concentration. A threshold may be selected such that if a loss of cooling situation occurs, the adiabatic temperature rise of the reaction mixture will not approach and/or reach the temperature at which a polyether rapidly decomposes (e.g., greater than 250° C.). A desired threshold may be determined empirically or selected from existing reference materials. For example, 15 percent unreacted propylene oxide may be a worst case reaction mixture for a polyol process reactor operating at a maximum reaction temperature of 120° C. When using a double metal cyanide catalyst, less that 5% unreacted oxide (e.g., less that 2%) may yield polyols with narrow (e.g., the most narrow) molecular weight distribution.

In some embodiments, less than 2% unreacted oxide may correspond to recycle ratios of 100 and above when the loop has only one feed point and one exit point and the molecular weight of the polyol product is 10 times higher than the molecular weight of the initiator. Recycle ratios corresponding to loops with multiple feed and exit points and with different combinations of molecular weights of initiator and product may be calculated, according to some embodiments of the disclosure.

Solvent

In some embodiments, methods, apparatus, and systems, according to some embodiments of the disclosure, may be practiced with one or more solvents (e.g., inert solvents). Examples of solvents may include, without limitation, aliphatic and aromatic hydrocarbons (e.g., toluene, hexanes) and/or ethers (e.g., tetrahydrofuran). According to some embodiments, a solvent (e.g., an inert solvent) may be included in producing an initial batch of polyol and/or subsequent batches of polyol. For example, an inert solvent may be used with a continuously-added initiator to produce an initial polyol batch.

Product

A product composition produced according to some embodiments of the disclosure may comprise polyether polyols within a range of molecular weights. For example, a product composition may comprise polyether polyols having molecular weights from about 400 to 40,000 daltons. In some embodiments, a reactor and/or reaction conditions may be configured to produce a product composition comprising polyether polyols having a narrow range of molecular weights. This may be assessed by any suitable molecular weight distribution metric. For example, a polydispersity index of a product composition may be from about 1.1 to about 2.0.

A low level of monofunctional unsaturated chains may be attained according to some embodiments. For example, a polyol may comprise less than about 0.05 meq/g monofunctional unsaturated chains, less than about 0.01 meq/g monofunctional unsaturated chains, less than about 0.005 meq/g monofunctional unsaturated chains, and/or less than about 0.001 meq/g monofunctional unsaturated chains. A product composition exiting a flow loop through a product outlet (e.g., before post-flow loop processing), in some embodiments, may comprise less than about 10 weight percent of unreacted monomer, less than about 5 weight percent of unreacted monomer, less than about 1 weight percent of unreacted monomer, and/or less than about 0.3 weight percent of unreacted monomer.

Methods

According to some embodiments, a method of forming a polyol may include providing a reactor, providing a reaction stream in the reactor, providing a monomer in the reaction stream (e.g., through a monomer inlet), providing an initiator in the reaction stream (e.g., through an initiator inlet), providing a catalyst (e.g., a DMC catalyst) in the reaction stream (e.g., through the catalyst inlet), contacting the reaction stream with the heat exchanger under conditions that permit thermal energy to be removed from the reaction stream, pumping the reaction stream around the flow loop with the pump. In some embodiments, the amounts of catalyst, monomer (e.g., oxide), and/or initiator (e.g., diol, triol) provided in the reaction stream may be independent of each other or interdependent on each other (e.g., stoichiometrically matched). A reactor may include, in some embodiments, a continuous flow loop in which at least a portion of the reaction stream circulates.

According to some embodiments, the recycle ratio may be as high as possible for a chosen combination of starter and product, such that the spread in monomer concentration and/or reaction chamber temperature are reduced and/or minimized. According to these embodiments, spread may be the maximum point to point variation within a flow loop of a reactor. For example, the spread in monomer concentration may be equal to or less than about 5 weight percent, equal to or less than about 2 weight percent, and/or equal to or less than about 1 weight percent. The spread in reaction chamber temperature (e.g., flow loop temperature) may be, for example, equal to or less than 100° C., equal to or less than 50° C., equal to or less than 20° C., equal to or less than 10° C., equal to or less than 5° C., and/or equal to or less than 2° C. In some embodiments, the spread in monomer concentration may be less than 1% and/or the spread in temperature may be less than 5° C. in both the direction of flow and in the direction of heat transfer. Low spreads in monomer concentration and flow temperature may produce polyether polyol(s) with desirable properties (e.g., molecular weight distribution and/or polymer homogeneity) in some embodiments.

According to some embodiments of the disclosure, methods of producing polyether polyols may be performed so as to minimize and/or eliminate monomer-rich cold spot regions. Methods of producing polyether polyol may be performed, in some embodiments, such that heat is removed efficiently (e.g., to allow the decoupling of unreacted monomer concentration and reactor temperature). Methods of producing polyether polyol may be performed, according to some embodiments, such that process parameters (e.g. temperature, pressure, residence time, flow rates, and pump speed) are controlled and effective mixing of reactants is achieved. For example, methods of producing polyether polyol may be performed so that a single phase is maintained or substantially maintained and the presence of a distinct vapor phase within the reaction stream is avoided.

A reaction stream may flow, in some embodiments, in a turbulent manner, in a substantially turbulent manner, in a laminar manner, and/or in a substantially laminar manner. In some embodiments, flow of a reaction stream may be within a transitional regime between substantially turbulent flow and substantially laminar flow. A heat exchanger may be configured and arranged to produce a reaction stream flow with good heat transfer properties, in some embodiments. A reaction stream flow may have, according to some embodiments, a Reynold's number up to or over about 2,000. For example, reaction stream flow may have a Reynold's number from about 1,000 to about 10,000, from about 10,000 to about 50,000, from about 10,000 to about 100,000, from about 100,000 to about 500,000, and/or from about 100,000 to about 1,000,000.

In some embodiments, a product polymer production rate per unit volume per hour of at least about 0.7 pounds per hour per gallon of reactor volume (0.08 kg/hr·L), at least about 1.7 pounds per hour per gallon of reactor volume (0.2 kg/hr·L), at least about 5 pounds per hour per gallon of reactor volume (0.6 kg/hr·L), at least about 12 pounds per hour per gallon of reactor volume (1.4 kg/hr·L), and/or at least about 17 pounds per hour per gallon of reactor volume (2 kg/hr·L) may be achieved. In some embodiments, a reactor may be configured and arranged and/or operated such that residence time is from about 30 minutes to about 300 minutes. According to some embodiments, it may be desirable to configure and arrange a reactor to have shorter or longer residence times (e.g., by using a catalyst of appropriate activity).

According to some embodiments, reactor configuration and/or operating conditions for a continuous loop flow process may be related to (e.g., determined by, dependent on) the molecular weight of the starter and/or the molecular weight of the corresponding product. For example, the relationship between the starter and product molecular weights may be expressed as follows:

$$\frac{s}{MW_s} = \frac{1}{MWp} \quad \text{(Eq. 6)}$$

wherein s is the weight fraction of starter in the fresh feed, MWs is the molecular weight of the starter, and MWp is the molecular weight of the polyol product. For example, where the starter is 400 g/mol and the product is 4000 g/mol, the feed may contain 10% starter and 90% monomer. In this case, a recycle ratio may be chosen to obtain desirable and/or optimal product properties.

Figure 3:
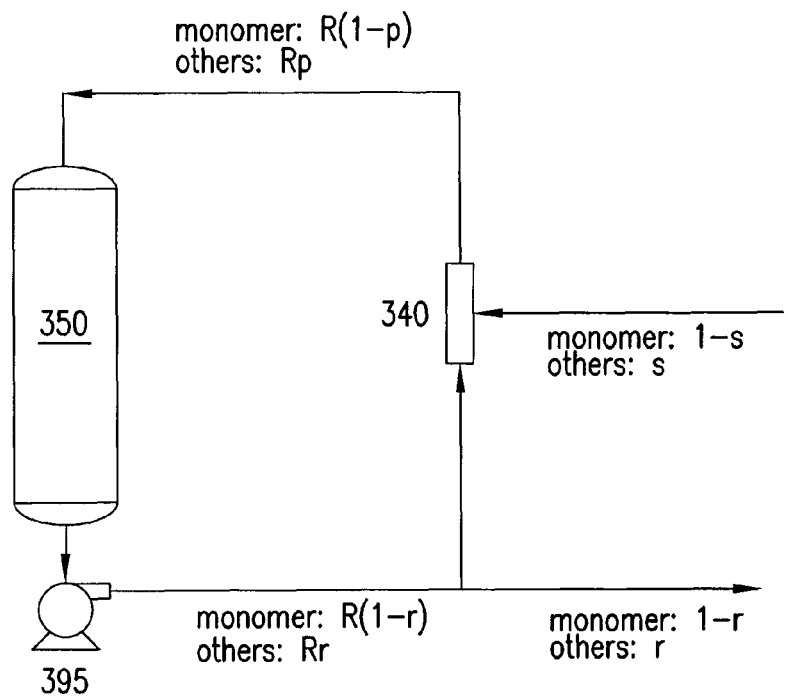
FIG. 3 illustrates a specific example embodiment of a reactor configuration according to the present disclosure.
Figure 4:
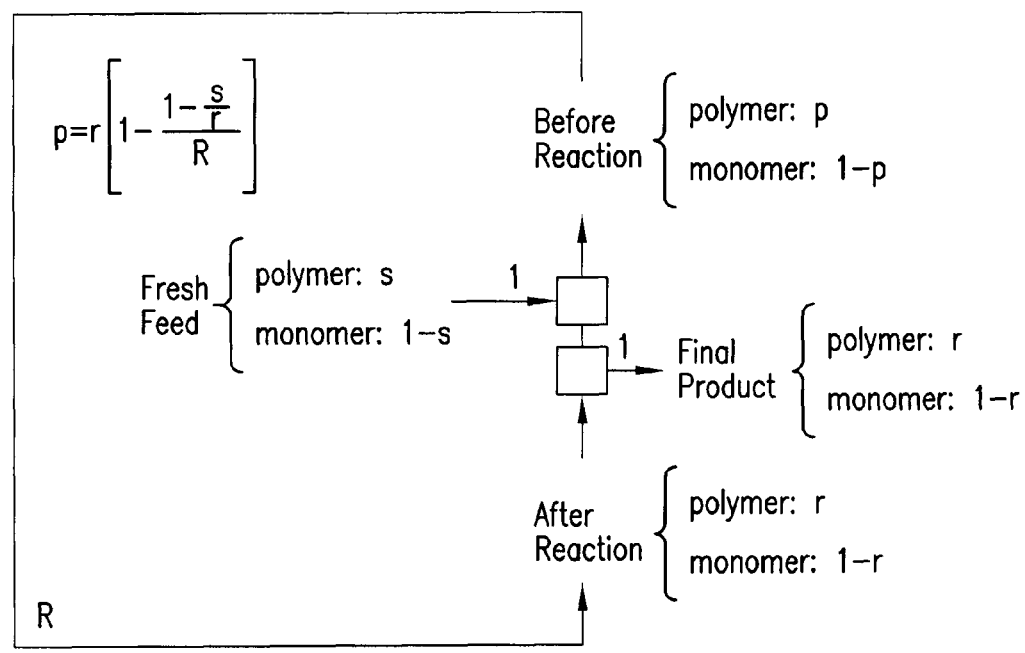
FIG. 4 illustrates a specific example embodiment of composition streams in a loop flow reactor configuration according to the present disclosure.

An example embodiment of a reactor configuration with only one feed stream and one product stream is shown in FIG. 3. The concentration of different components at various points in a loop may be calculated using the notation shown, which assumes one (1) pound of material entering or leaving the loop. As shown in FIG. 4, the fraction of polymer in the reaction stream before reaction (e.g., returning to the reactor) may be represented as p. Thus, the amount of monomer in the reaction stream before reaction may be expressed as 1−p. Similarly, the fractions of polymer and monomer in the fresh feed may be represented as s and 1−s, respectively. The fractions of polymer and monomer in the final product may be represented as r and 1−r, respectively. A recycle ratio may be the corresponding rate of material going around a loop. At the feed addition point the amount of monomer coming in the fresh feed and the recycle stream may equal to the amount of monomer leaving the recycle stream:

$$(R-1)(1-r)+(1-s)=R(1-p) \quad \text{(Eq. 7)}$$

wherein, s is the weight fraction of starter in the fresh feed, r is the fraction of polymer in the final product (after reaction), and R is the recycle ratio. Equation 6 may be solved for p as follows:

$$p = \frac{s + r(R-1)}{R} \quad \text{(Eq. 8)}$$

or $$p = r\left[1 - \left(\frac{\left(1 - \frac{s}{r}\right)}{R}\right)\right] \quad \text{(Eq. 9)}$$

Table 1 presents a few illustrative examples of when the product stream contains 99% polymer (r=0.99), the fresh feed contains 10% starter (s=0.10), and the recycle ratio is as shown. Thus, as the recycle stream circulates around the flow loop reactor, monomer concentration changes from 9.9% to 1% if the recycle ratio is 10. Similarly, monomer concentration changes from 2% to 1% if the recycle ratio is 100. The highest value may be found at or near the monomer inlet and the lowest value may be found at the product outlet. According to some embodiments, the higher the recycle ratio, the lower the difference in unreacted monomer concentration between heat exchanger inlet and outlet streams.

TABLE 1

| R | p | 1 − p |
|---|---|---|
| 2 | 0.5450 | 0.4550 |
| 10 | 0.9010 | 0.0990 |
| 20 | 0.9455 | 0.0545 |
| 50 | 0.9722 | 0.0278 |
| 100 | 0.9811 | 0.0189 |

Figure 5:
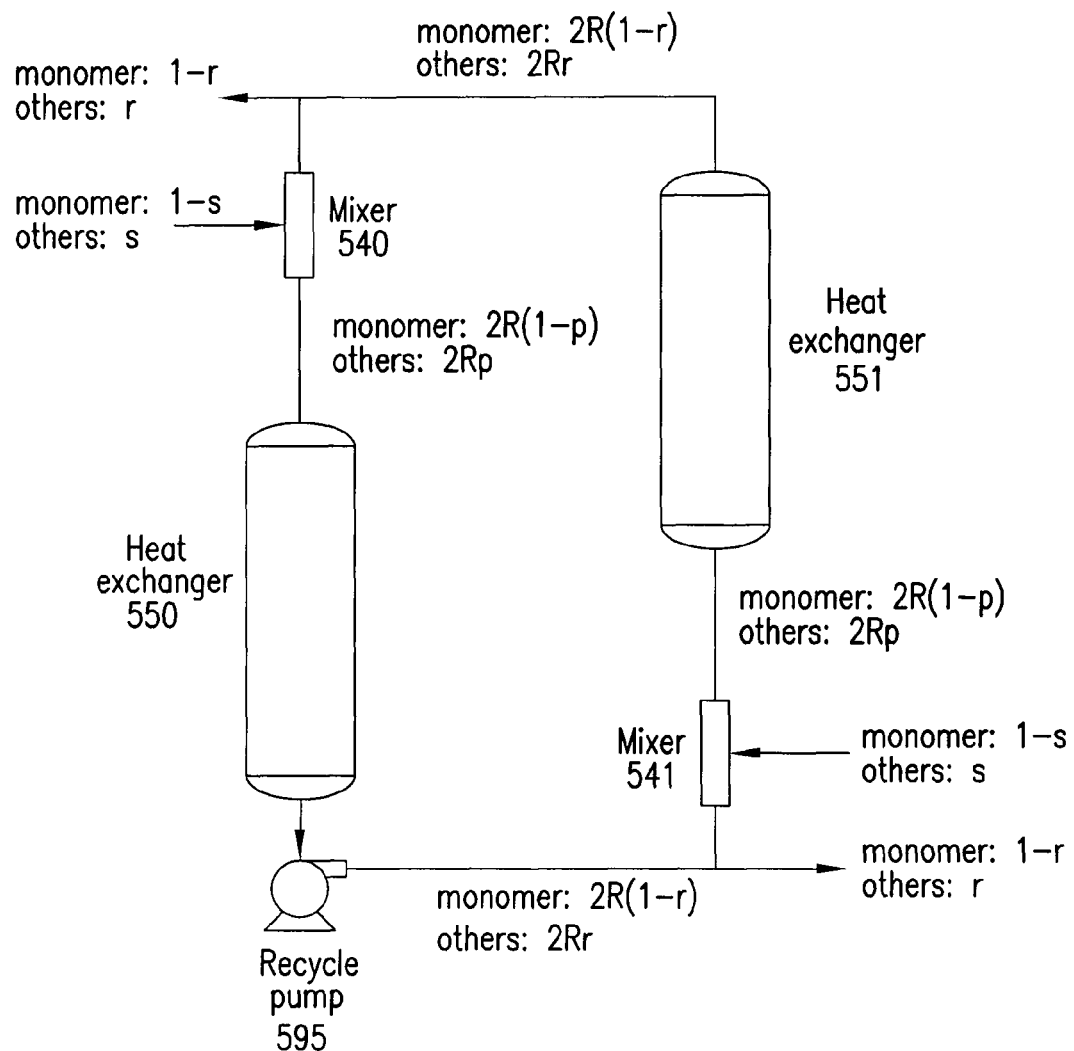
FIG. 5 illustrates a specific example embodiment of a reactor configuration according to the present disclosure.

A specific example embodiment in which a reactor comprises two heat exchangers in series, two equal feed streams, and two equal product streams is shown in FIG. 5. At the point of addition of one of the feeds, the amount of monomer entering in the fresh feed and the recycle stream is equal to the amount of monomer leaving in the recycle stream:

$$(2R-1)(1-r)+(1-s)=2R(1-p) \quad \text{(Eq. 10)}$$

Equation 9 may be solved for p as follows:

$$p = \frac{s + r(2R - 1)}{2R} \quad \text{(Eq. 11)}$$

This configuration will have the same values of s, r, and p as the configuration with only one heat exchanger but at half the recycle ratio. Similarly, scaling up to N heat exchangers may allow a reduction in the recycle ratio by a factor of 1/N.

Experiments with double metal cyanide catalysts performed in connection with the present disclosure have shown that desirable product properties may result when the spread in temperature and the spread in monomer concentration around the loop are minimized. According to some embodiments, the spread in temperature and/or the spread in monomer concentration around the loop may be minimized by operating a reactor at a high recycle ratio. For example, a recycle ratio may be equal to or greater than about 10, equal to or greater than about 20, equal to or greater than about 50, equal to or greater than about 75, equal to or greater than about 100, and/or equal to or greater than about 500. The spread in temperature and/or the spread in monomer concentration around the loop may be minimized, in some embodiments, by using a reactor having multiple monomer addition and product removal points. According to some embodiments, a process performed at a higher recycle ratio may be associated with a higher fluid reaction velocity and/or a higher rate of heat transfer for removal of the heat of reaction.

For viscous fluids under forced convection, overall heat transfer coefficients may be from about 10 to about 100 Btu/hr-square feet-° F. When such fluids circulate through tubes of 2 inch internal diameter, for example, these correspond to a volumetric heat removal rate of 240 to 2,400 Btu/hr-cubic feet-° F. In some embodiments, the heat that is released in the polymerization of propylene oxide is approximately 32,000 Btu/cubic feet. A worst case scenario of feed streams that enter the reactor at the same temperature as the reaction temperature would lead to a value of 13 to 133 hr-° F. for the product of the residence time and the temperature difference between process fluid and coolant. For maximum throughput, the spread in temperature in the direction of heat transfer may be thus minimized at the highest possible heat transfer coefficient, which may be desirable for optimum product properties.

In some embodiments, residence time may be expressed as the process side reactor volume in gallons divided by total reactor volumetric throughput rate in gallons per minute. Circulation time, in some embodiments, may be expressed as the process side reactor volume in gallons divided by the recycle pump volumetric throughput rate in gallons per minute. Recycle ratio may be expressed as the residence time in minutes divided by the circulation time in minutes. A volumetric heat removal rate may be expressed as the process heat transfer coefficient, U, in Btu/hr-square feet-° F., multiplied by the heat exchange area, A, in square feet, of the heat exchange apparatus divided by the total reactor system volume, in cubic feet. As one of ordinary skill in the art having the benefit of the present disclosure may appreciate, consistency respecting whether process side or outside parameters are used as to U and surface area calculations and determinations may be desirable in some embodiments. In some embodiments, the calculations contained herein are based on the outside surface areas and outside diameters of heat exchange tubes, coils, etc. whether or not the reactor mixture flows through such tubes, coils, etc. or not.

An alkoxylation system and/or apparatus, according to some embodiments, may have a volumetric heat removal rate equal to or greater than about 85 Btu/hr-cubic feet-° F., equal to or greater than about 150 Btu/hr-cubic feet-° F., equal to or greater than about 350 Btu/hr-cubic feet-° F., equal to or greater than about 400 Btu/hr-cubic feet-° F., equal to or greater than about 600 Btu/hr-cubic feet-° F., equal to or greater than about 1200 Btu/hr-cubic feet-° F., equal to or greater than about 2000 Btu/hr-cubic feet-° F., and/or equal to or greater than about 2500 Btu/hr-cubic feet-° F., and/or equal to or greater than about 3000 Btu/hr-cubic feet-° F., and/or equal to or greater than about 3500 Btu/hr-cubic feet-° F.

Reaction temperature range may depend, at least in part, on the catalyst(s) used. For example, the reaction temperature range for a DMC catalyst may be from about 100° C. to about 200° C. (e.g., from about 120° C. to about 160° C.). In some embodiments, a lower DMC catalyst temperature range may make it more difficult to reach less than 2% unreacted oxide. A higher DMC catalyst temperature range may favor undesired reactions including, for example, chain transfer to monomer, catalyst deactivation, and product decomposition.

According to some embodiments, a temperature difference between a process fluid and a coolant may be less than about 50° C. and/or less than about 5° C., for example, to avoid temperature spreads in the direction of heat transfer. A difference of about 5° F. (2.8° F.) may lead to average residence times in the loop of 2.6 hrs and above when the feed enters at the temperature of the reactor contents. A lower limit for average residence time may be reduced to 1 hour or less, in some embodiments, by introducing the feed at a temperature that is below the reactor temperature and/or by increasing flow velocity (e.g., to improve heat transfer coefficients). In some embodiments, higher flow velocities may be achieved at higher recycle ratios and/or in heat exchangers with pipe diameters of less than about 2 inches.

In some embodiments, a method may further comprise contacting a reaction stream with a capping material. For example, method for producing a polyether polyol may include contacting a reaction stream with an unreacted monomer, for example, ethylene oxide capping material. In some embodiments, a capping may be performed after product has exited a reaction chamber through a product outlet.

A reaction and/or a reaction step may be conducted continuously (e.g., sustained at the same or approximately the same level for a period of time), according to some embodiments. For example, an alkoxylation process may include (a) continuously contacting a compound comprising an active hydrogen, a compound comprising an alkene oxide, and a double metal cyanide catalyst in a continuous flow loop under conditions that permit formation of a polyether polyol at least in part by alkoxylation, (b) continuously removing the heat of reaction from at least a portion of the continuous flow loop at a thermal energy removal rate of at least about 400 Btu/hour-cubic foot·° F., (c) continuously removing from the continuous flow loop at least a portion of the polyether polyol produced, and (d) continuously recycling at least a portion of the remaining material at a recycle ratio of at least about 10.

Systems

The present disclosure further relates to systems for continuous and/or batch polymerization of a monomer to form, for example, a polyether polyol. A system may include a reactor apparatus, a catalyst (e.g., a DMC catalyst), a monomer and an initiator, according to some embodiments. An apparatus in a system may include, for example, a reactor having a reactor volume, the reactor comprising (1) at least one flow loop operable to permit the flow of a reaction stream; (2) at least one product outlet in fluid communication with the at least one flow loop; (3) at least one catalyst inlet in fluid communication with the at least one flow loop and operable to permit catalyst to flow into the at least one flow loop; (4) at least one monomer inlet in fluid communication with the at least one flow loop and operable to permit monomer to flow into the at least one flow loop; (5) at least one heat exchanger in fluid communication with the at least one flow loop and operable to remove heat of reaction from the reaction stream (e.g., at a rate of at least about 400 Btu/hour-cubic foot·° F. (7.4 kW/m$^3$·° K); and (6) at least one pump apparatus operable to pump the reaction stream around the at least one flow loop. In some embodiments, a system may include two or more flow loops.

A heat exchanger may include a first heat exchanger, with a housing through which a heat transfer media flows and a plurality of static mixer heat exchange tubes through which a reaction stream flows, the reactor stream flowing out from the first heat exchanger into the flow loop for further movement therethrough. A heat exchanger may also include at least one additional heat exchanger on the flow loop for receiving a reaction stream and for removing heat of reaction or polymerization from the reaction stream. In some embodiments, a pump may move a reaction stream to (e.g., along) a product outlet such that at least a portion of the reaction stream may flow out through the product outlet and the balance of the reaction stream continues to move through the flow loop.

A system may include, in some embodiments, an apparatus in which a monomer inlet is positioned below (downstream) a catalyst inlet. According to some embodiments, an apparatus (e.g., an apparatus included in a system) may include a monomer inlet and a catalyst inlet, both of which are positioned above (upstream) a heat exchanger. An apparatus (e.g., an apparatus included in a system) may include at least one static mixer disposed in the flow loop between the at least one catalyst inlet and the at least one monomer inlet for mixing materials flowing into the flow loop. An inlet may include an injector, for example, an injector comprising a hollow injector inlet and a plurality of spaced-apart hollow arms in fluid communication with the hollow injector inlet, each of the plurality of hollow arms having a plurality of spaced-apart fluid exit ports through which material flows into the flow loop. An inlet (e.g., a catalyst inlet, a monomer inlet, and/or an initiator inlet) may be configured and arranged to admit solvent into a reaction chamber. For example, a catalyst inlet may admit a solvent with the catalyst, a monomer inlet may admit a solvent with the monomer, and/or an initiator may admit a solvent with the initiator.

In some embodiments, a system may be configured and arranged to maintain or substantially maintain a reaction stream (e.g., including polymer) as a liquid phase. A system may be configured and arranged, in some embodiments, to have a high recycle ratio (e.g., equal to or greater than about 10). According to some embodiments, a system may be configured and arranged to have a residence time equal to or less than about 5 hours, equal to or less than about 4 hours, equal to or less than about 3 hours, equal to or less than about 2 hours, equal to or less than about 1 hour, and/or equal to or less than about 30 minutes.

Figure 6:
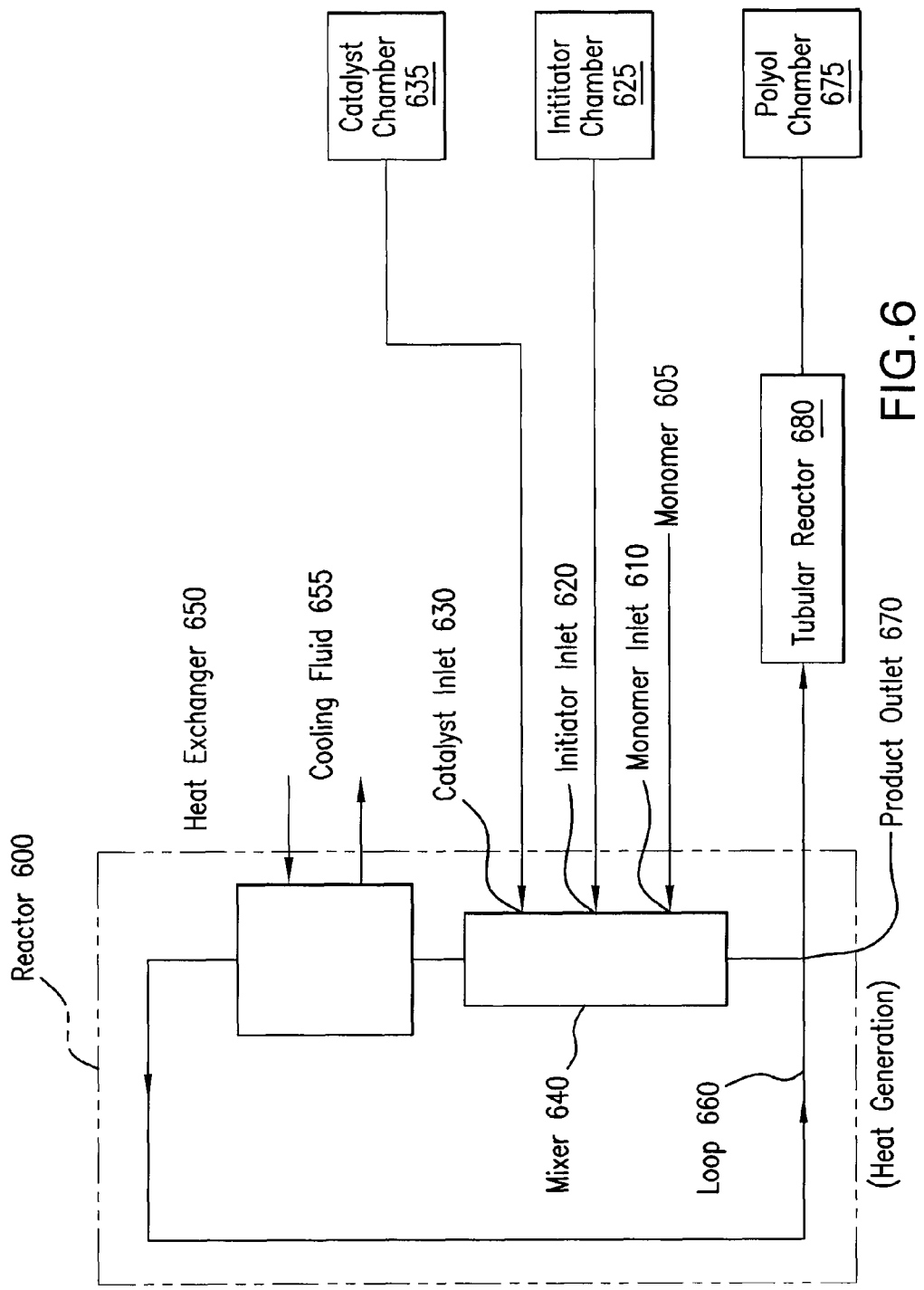
FIG. 6 is a schematic illustration of a polyol reactor according to a specific example embodiment of the disclosure.

A specific example embodiment of a reactor system is shown in FIG. 6. Reaction chamber 600 comprises monomer inlet 610, initiator inlet 620, catalyst inlet 630, mixer 640, heat exchanger 650, flow loop 660, and product outlet 670. Heat may be generated at any point within flow loop 660. As shown, monomer 605 may enter mixer 640 of flow loop 660 through monomer inlet 610. Initiator may enter mixer 640 of flow loop 660 through initiator inlet 620 from initiator chamber 625. Catalyst may enter mixer 640 of flow loop 660 through catalyst inlet 630 from catalyst chamber 635. Monomer, initiator, and catalyst form a reaction stream which may move (e.g., flow under the action of a pump) into heat exchanger 650 of flow loop 660, wherein heat is removed via cooling fluid 655. Upon exiting heat exchanger 650, the reaction stream may continue to move through flow loop 660. At least a portion of a reaction stream may exit flow loop 660 at product outlet 670 (a "product stream"). A product stream may subsequently enter tubular reactor 680, where unwanted, unreacted monomer may be removed. Thereafter, product fluid may move to polyol chamber 675. Heat (e.g., heat of reaction, friction) may be generated anywhere in the region indicated in FIG. 6.

As will be understood by those skilled in the art who have the benefit of the instant disclosure, other equivalent or alternative compositions, apparatus, methods, and systems for alkoxylation to produce, for example, a polyether polyol can be envisioned without departing from the description contained herein. Accordingly, the manner of carrying out the disclosure as shown and described is to be construed as illustrative only.

Persons skilled in the art may make various changes in the shape, size, number, and/or arrangement of parts without departing from the scope of the instant disclosure. For example, the presence and sequence of monomer, initiator, catalyst, and/or oxide inlets may be adjusted as desired. In addition, the size of a reactor may be scaled up or down to suit the needs and/or desires of a practitioner. Also, where ranges have been provided, the disclosed endpoints may be treated as exact and/or approximations as desired or demanded by the particular embodiment. In addition, it may be desirable in some embodiments to mix and match range endpoints. Additional reactors may be combined in series, parallel, or any other configuration. A reactor may be configured and arranged as a unit. A reactor and/or reactor components may be configured and arranged as modules (e.g., removable modules). A reactor and/or reactor components may be configured and arranged to be disposable, serviceable, interchangeable, and/or replaceable. These equivalents and alternatives along with obvious changes and modifications are intended to be included within the scope of the present disclosure. Accordingly, the foregoing disclosure is intended to be illustrative, but not limiting, of the scope of the disclosure as illustrated by the following claims.

EXAMPLES

Some specific example embodiments of the disclosure may be illustrated by one or more of the examples provided herein.

Example 1

Catalyst Preparation

A double metal cyanide catalyst was prepared using the following materials:

Solution A: $ZnCl_2$ 114 g (0.836 moles) and $H_2O$ 114 g (6.33 moles)

Solution B: $K_3Co(CN)_6$ 11.1 g (0.033 moles), $H_2O$ 453 g (25.17 moles) and tert-butanol 58.5 g (0.789 moles, density 0.786 g/ml), stirred 30 minutes at 30° C.

Solution C: 153 g tert-butanol (2.06 moles) and 84 g $H_2O$ (4.67 moles)

Solution D: 214.5 g tert-butanol (2.89 moles) and 1.5 g $H_2O$ (0.083 moles)

Figure 7:
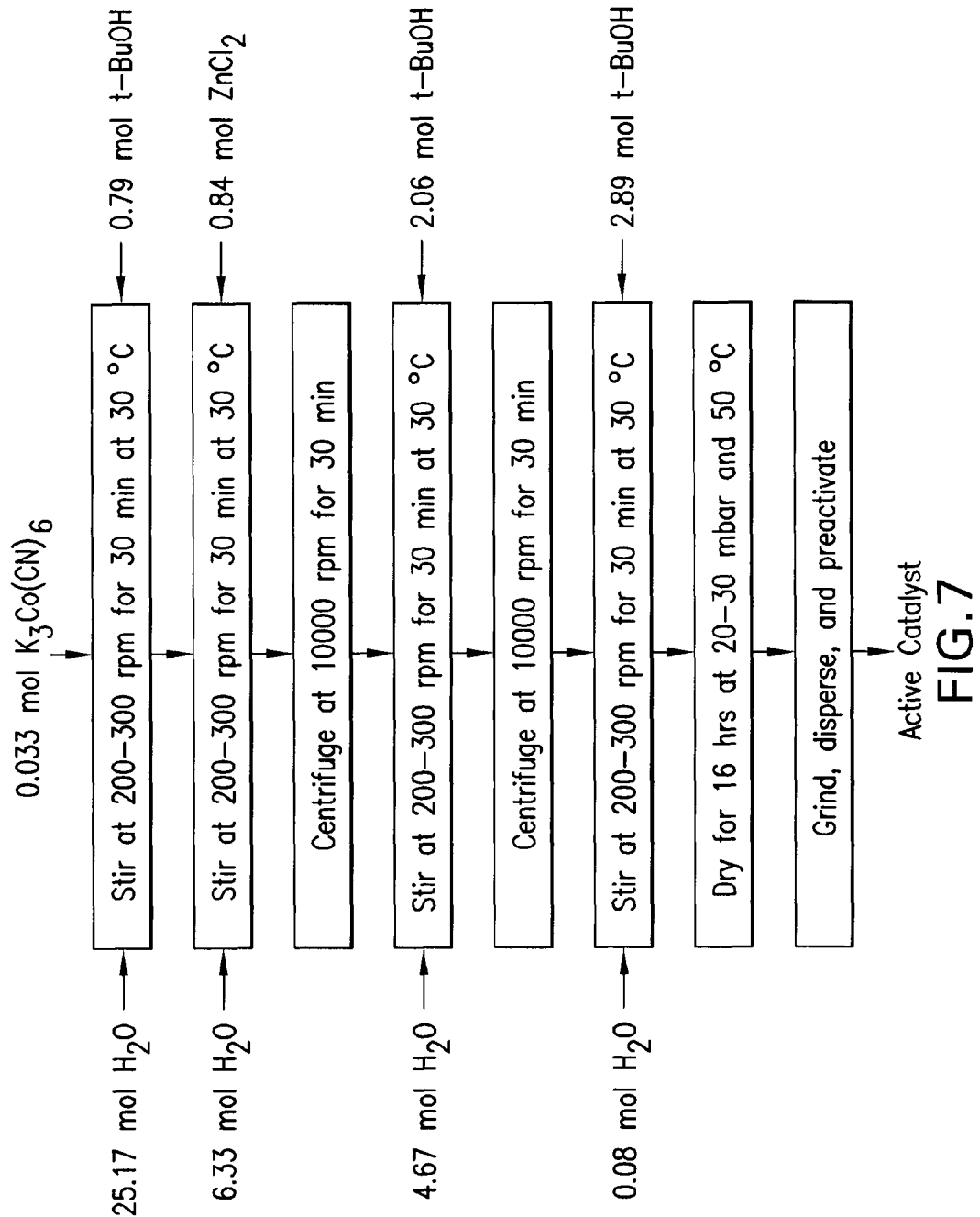
FIG. 7 is a schematic illustration of a specific example embodiment of a process for preparing an active catalyst according to the present disclosure.

Solution B was added to a three-neck, balloon flask equipped with a mechanical agitator. The flask was submersed in a constant temperature bath. Solution A was added to Solution B over a period of 25 minutes (flow of 5 ml/min) using a graduated dropping funnel to allow control of the flow rate. The temperature of the mixture was maintained at 30±4° C. The minimum agitation speed was 200-300 RPM. After complete addition of Solution A, the mixture was agitated for 30 minutes at 30±4° C. The white precipitate was separated from the mixture using a centrifuge with the diameter of 15-20 cm. The mixture was centrifuged for 30 minutes at 8,000-10,000 RPM. After decantation of the supernatant, the centrifuge cake was dispersed in Solution C using the same equipment for 30 minutes, maintaining an agitation speed of 200-300 RPM. After washing, the mixture was centrifuged as before for 30 minutes at 8,000-10,000 RPM. After decantation of the supernatant, the centrifuge cake was dispersed in Solution D using the same equipment for 30 minutes, maintaining an agitation speed of 200-300 RPM. After washing, the mixture was centrifuged as before for 30 minutes at 8,000 RPM. After centrifugation, the centrifuge cake was dried for 16 hours at around 20-30 mbar at 50° C. in a vacuum oven. The catalyst was milled in a mortar to get rid of the agglomerates. A flow chart for this process is illustrated in FIG. 7.

Example 2

Polyol Production in Continuous Alkoxylation Plant

The catalyst of Example 1 was used to run experiments in a continuous alkoxylation plant whose schematic diagram is provided in FIG. 6. The total volume of the loop flow reactor was 28 L and the volume of the plug flow reactor was 25 L. The mixer in this example was a Chemineer HEV 2 static mixer, which was operated at a Reynolds number of more than 10,000. The initiator was a 400 Da diol and the targeted product was a 4000 Da diol. Both reactors were operated at 140 C, with 25 ppm catalyst in the product, and a residence time of 3 hrs in each reactor. Material was circulated around the loop at a rate of 7500 kg/hr to guarantee minimal spread in monomer concentration and in temperature. The temperature difference between cooling and process fluids was only 1° C. The level of unreacted monomer in the loop flow reactor was 0.3%. The product had a dynamic viscosity of 993 cSt measured at 25 C and a polydispersity of 1.11.

Example 3

Polyol Production in Continuous Alkoxylation Plant

The catalyst of Example 1 was used in the plant of Example 2 with both reactors operating at 110 C, 10 ppm catalyst in the product, and a residence time of 1.5 hrs in each reactor. The initiator and targeted product were the same as in Example 2. Material was circulated around the loop at a rate of 7500 kg/hr to guarantee minimal spread in monomer concentration and in temperature. The temperature difference between cooling and process fluids was only 1 C. The level of unreacted monomer in the loop flow reactor was 9.0%. The product had a dynamic viscosity of 4170 cSt measured at 25 C and a polydispersity of 1.40.

What is claimed is:

1. An alkoxylation process comprising:
   continuously contacting a compound comprising at least one active hydrogen, a compound comprising an alkene oxide, and a double metal cyanide catalyst in a continuous flow loop under conditions that permit formation of a polyether polyol at least in part by alkoxylation;
   continuously maintaining the spread in flow loop temperature equal to or less than about 5° C.; and
   continuously maintaining the spread in unreacted alkene oxide concentration in the continuous flow loop at no more than about 2 weight percent.

2. A process according to claim 1, wherein the continuously maintaining the spread in flow loop temperature equal to or less than about 5° C. further comprises continuously maintaining the spread in flow loop temperature equal to or less than about 2° C.; and
   wherein the continuously maintaining the spread in unreacted alkene oxide concentration in the continuous flow loop at no more than about 2 weight percent further comprises continuously maintaining the spread in unreacted alkene oxide concentration in the continuous flow loop at no more than about 1 weight percent.

3. A process according to claim 1, wherein the compound comprising an alkene oxide comprises a compound selected from the group consisting of ethylene oxide, propylene oxide, butylene oxide, and mixtures thereof.

4. A process according to claim 1, wherein the compound comprising at least one active hydrogen comprises a polymer of a material selected from the group consisting of ethylene glycol, propylene glycol, glycerine, 1,1,1-trimethylol propane, 1,1,1-trimethylol ethane, 1,2,3-trihydroxybutane, pentaerythritol, xylitol, arabitol, mannitol, 2,5-dimethyl-3-hexyn-2,5-diol, 2,4,7,9-tetramethyl-5-decyne-4,7-diol sucrose, sorbitol, an alkyl glucoside, and combinations thereof, the polymer having a molecular weight of from about 30 to about 900 daltons.

5. A process according to claim 1, wherein the double metal cyanide catalyst comprises at least one metal selected from the group consisting of potassium, zinc, cobalt, iron, chromium, platinum, iridium, and combinations thereof.

6. A process according to claim 1, wherein the double metal cyanide catalyst comprises zinc hexacyanocobaltate $Zn_2[Co(CN)_6]_2$.

7. A process according to claim 6, wherein the continuously maintaining the spread in flow loop temperature equal to or less than about 5° C. further comprises continuously removing the heat of reaction from at least a portion of the continuous flow loop at a thermal energy removal rate of at least about 400 Btu/hour-cubic foot·° F.; and
   wherein the continuously maintaining the spread in unreacted alkene oxide concentration in the continuous flow loop at no more than about 2 weight percent further comprises continuously recycling at least a portion of (1) the compound comprising at least two active hydrogens, (2) the compound comprising an alkene oxide, (3) the double metal cyanide catalyst, and (4) the polyether polyol through the flow loop at a recycle ratio of at least 10.

8. A process for producing a polyether polyol, the process comprising:
   providing a reactor having a reactor volume equal to or greater than about 1 cubic meter, the reactor comprising
      at least one continuous flow loop operable to permit the continuous flow of at least a portion of a reaction stream,
      at least one monomer inlet in fluid communication with the at least one flow loop,
      at least one initiator inlet in fluid communication with the at least one flow loop,
      at least one catalyst inlet in fluid communication with the at least one flow loop,
      at least one heat exchanger in fluid communication with the at least one flow loop and operable to remove heat of reaction from the reaction stream, and
      at least one product outlet in fluid communication with the at least one flow loop and downstream of the at least one catalyst inlet;
   providing a reaction stream flowing in the continuous flow loop;
   admitting a monomer into the reaction stream through the at least one monomer inlet;
   admitting an initiator into the reaction stream through the at least one initiator inlet;
   admitting a double metal cyanide catalyst into the reaction stream through the at least one catalyst inlet under conditions that permit formation of a polyether polyol;
   contacting the reaction stream with the heat exchanger under conditions that permit thermal energy to be removed from the reaction stream at a thermal energy removal rate of at least about 400 Btu/hour-cubic foot·° F.;
   removing a portion of the reaction stream through the at least one product outlet; and
   recirculating the remaining portion of the reaction stream around the flow loop, wherein the recycle ratio is at least about 10, the spread in monomer concentration may be equal to or less than about 5%, and the spread in flow loop temperature may be equal to or less than about 5° C.

9. A process according to claim 8, wherein the monomer comprises a monomer selected from the group consisting of ethylene oxide, propylene oxide, butylene oxide, and mixtures thereof.

10. A process according to claim 8, wherein the initiator comprises a polymer of a material selected from the group consisting of ethylene glycol, propylene glycol, glycerine, 1,1,1-trimethylol propane, 1,1,1-trimethylol ethane, 1,2,3-trihydroxybutane, pentaerythritol, xylitol, arabitol, mannitol, 2,5-dimethyl-3-hexyn-2,5-diol, 2,4,7,9-tetramethyl-5-decyne-4,7-diol, sucrose, sorbitol, an alkyl glucoside, and combinations thereof, the polymer having a molecular weight of from about 300 to about 900 daltons.

11. A process according to claim 8, wherein the double metal cyanide catalyst comprises at least one metal selected from the group consisting of potassium, zinc, cobalt, iron, chromium, platinum, iridium, and combinations thereof.

12. A process according to claim 8, wherein the double metal cyanide catalyst comprises zinc hexacyanocobaltate $Zn_2[Co(CN)_6]_2$.

13. A process according to claim 12, wherein (a) the thermal energy removal rate is at least about 400 Btu/hour-cubic foot·°F., (b) the recycle ratio is at least about 10, (c) the spread in monomer concentration may be equal to or less than about 2%, and (d) the spread in flow loop temperature may be equal to or less than about 5° C.

14. A process according to claim 8, wherein the reactor volume is equal to or greater than about 12 cubic meters.

15. A process according to claim 8, wherein the providing a reaction stream flowing in the continuous flow loop further comprises providing a reaction stream flowing in the continuous flow loop with a Reynold's number of from about 1,000 to about 1,000,000.

* * * * *